United States Patent

Hashizume

[11] Patent Number: 6,091,557
[45] Date of Patent: Jul. 18, 2000

[54] OFFSET FREE THERMAL ASPERITY T/A DETECTOR

[75] Inventor: Motomu Hashizume, Plano, Tex.

[73] Assignee: Texas Instruments Incorporated, Dallas, Tex.

[21] Appl. No.: 08/890,089

[22] Filed: Jul. 9, 1997

Related U.S. Application Data

[60] Provisional application No. 60/021,579, Jul. 11, 1996.

[51] Int. Cl.[7] ......................................................... G11B 5/09
[52] U.S. Cl. .................. 360/46; 360/66; 360/67; 360/53; 360/25
[58] Field of Search .................................. 360/66, 67, 46, 360/53, 25

[56] References Cited

U.S. PATENT DOCUMENTS

| | | | |
|---|---|---|---|
| 3,473,131 | 10/1969 | Perkins, Jr. | 327/178 |
| 3,566,281 | 2/1971 | Baumann | 327/180 |
| 4,356,389 | 10/1982 | Quirey et al. | 235/455 |
| 4,914,398 | 4/1990 | Jove et al. | 361/111 |
| 5,715,110 | 2/1998 | Nishiyama et al. | 360/67 |
| 5,818,656 | 10/1998 | Klaassen et al. | 360/67 |
| 5,834,969 | 11/1998 | Umeyama et al. | 360/46 X |
| 5,852,521 | 12/1998 | Umeyama et al. | 360/67 X |

FOREIGN PATENT DOCUMENTS

| | | |
|---|---|---|
| 0 170 336 A2 | 7/1985 | European Pat. Off. . |
| 0 353 852 A2 | 6/1989 | European Pat. Off. . |
| 0 553 993 A2 | 1/1993 | European Pat. Off. . |
| 0 553 993 A3 | 1/1993 | European Pat. Off. . |

*Primary Examiner*—Alan T. Faber
*Attorney, Agent, or Firm*—W. Daniel Swayze, Jr.; W. James Brady III; Frederick J. Telecky, Jr.

[57] ABSTRACT

A circuit for detecting a disturbance signal in an information signal for a read channel circuit includes a resistor connected to ground and a capacitor to form an RC circuit to detect the disturbance. The read channel receives the information signal and the detection signal.

4 Claims, 2 Drawing Sheets

OFFSET FREE THERMAL ASPERITY T/A DETECTOR

This application claims benefit of provisional application 60/021,579 filed Jul. 11, 1996.

TECHNICAL FIELD OF THE INVENTION

This invention relates to a method and circuitry for detecting and removing additive transient disturbances in a data channel, and more particularly, to method and circuitry for detecting electrical transients caused by temperature change in a magneto-resistive (MR) sensor due to physical contact of the sensor with the recording surface of a rotating magnetic disk.

BACKGROUND OF THE INVENTION

Disturbances which occur in a data channel can be categorized as either additive or multiplicative. An undesirable additive disturbance signal is simply added to the information (data) signal. An undesirable multiplicative disturbances or data density change causes a modulation of the data signal.

In the data channel, where the signal sensing transducers, for example magneto-resistive (MR) sensors are exposed to the air in the air bearing surface of a slider assembly and a rotating magnetic disk, additive disturbances can occur due to physical frictional contact of the sensors(s) with the moving recording surface of the disk. The disturbances result from the friction-generated elevated temperature (up to 120° C.) at the contact spot. This friction-generated elevated temperature produces a small yet sudden increase in temperature of the MR sensor, for example in the order of 1° C. averaged over the entire sensor within about 50 to 100 nanoseconds. Due to the nonzero temperature coefficient of resistance of the MR sensor (approximately 0.003/° C. for permalloy), the sensor resistance will increase with this sudden temperature rise. The heat conducted into the MR sensor from the hot spot will diffuse slowly to the environment of the sensor, causing the resistance increase to decay slowly to the original value. Typically, a drop to about 30% of the thermally induced resistance change will occur in 1.5 to 5 microseconds (ps).

Such a combination of signals and disturbances cause many problems with signal detection in the data channel. The automatic gain control (AGC) circuit in the channel may fade out quickly during the transient and recover only slowly. Even if an AGC circuit were to accommodate the disturbed signal, the thermal transient would still result in a peak shift, for example, the data signal is differentiated for peak detection, and as a result of this the thermal transient will also be differentiated. This leads to an extra zero crossing and a shift of the zero crossing level after the thermal transient.

FIG. 1 illustrates the magnetic signal or the information signal 2 to be detected by the MR sensor without the disturbance.

In FIG. 2, a disturbance signal 4 is illustrated without the information signal 2, which may be caused by the physical frictional contact with the sensor with the moving recording surface of the disk.

FIG. 3 illustrates two signals, namely the disturbance signal 4 plus the information signal 2 to form the input signal 6 detected by the magneto-resistive head from the MR sensor and additively combined.

Several devices illustrated in the below references are attempted unsuccessfully to detect the information signal 4 during time period of a disturbance signal 4.

U.S. Pat. No. 3,566,281 discloses positive and negative peak detection, which are offset by a constant voltage and averaged and subtracted from the delayed input signal.

U.S. Pat. Nos. 3,473,131 and 4,356,389 are other patents which do not solve the problems of additive disturbances.

U.S. Pat. No. 4,914,398 discloses positive and negative envelope detectors and a buffer which interconnects the detectors with a nonlinear signal-adaptive filter. However, the device of this patent introduces phase distortion which is caused by the low pass filter. The sharp disturbance signal 5, as illustrated in FIG. 3, tends to be an abrupt change from the steady state, and the filter response makes it difficult to respond to these abrupt changes. In consequence, it is difficult to detect high frequency responses. Thus, it is difficult to maintain group delay

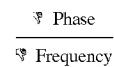

due to the phase distortion and ripple rejection simultaneously, inspite of the adaptive low pass filter.

In order to eliminate the disturbance signal 4 one of the intended requirements is to determine when the disturbance signal occurs, namely in FIG. 3, at $t_1$.

One circuit to detect when the sharp disturbance signal occurs, namely at $t_1$ is a threshold detector in the form of a comparator. Such a detector is illustrated in FIG. 4.

The comparator 100 compares the output of amplifier 104 with the output of voltage source 102. The voltage source 102 is set at a threshold voltage. The comparator 100 outputs a signal when the output of the amplifier 104 exceeds the threshold voltage. If the threshold voltage is sufficiently high, for example 20% of the sharp disturbance signal 5 over the zero level of the information signal 2. When the sharp disturbance signal 5 exceeds the threshold voltage, a signal, for example a TA signal, output from the comparator 100, indicates the occurrence of the sharp disturbance signal 5.

FIG. 5 illustrates a MR head 130 connected to a preamp 100 and connected to a read channel circuit 120. The TA signal is activated by the sharp disturbance signal 5.

The problem with this configuration is that the circuit does not take into consideration a DC offset of the information signal 2. The amplifier which may be a preamplifier may cause the information signal 2 to be biased with a DC offset voltage. This DC offset voltage effectively raises the information signal 2 to a point above the threshold voltage causing a false indication of the sharp disturbance signal.

Thus, it is desirable to eliminate the disturbance signal offset voltage from the information signal 2 to provide for more accurate detection of the sharp disturbance signal 5.

SUMMARY OF THE INVENTION

A circuit and method are disclosed for eliminating the offset, for example a DC offset produced in an amplifier, or more specifically a prestage amplifier which may be connected to a magneto-resistive (MR) head. The DC offset may cause false triggering of a detector which may include comparator and threshold circuit leading to false detection of the sharp disturbance signal. A RC circuit may be used to eliminate this offset, while maintaining the group delay of the information signal. The capacitor may be positioned in the signal path of the information signal or may be positioned in a shunt circuit connected to the direct signal path of the information signal.

The comparator and resistor eliminate the DC offset from the direct signal path, leaving only the information signal.

The present invention includes an apparatus for detecting a disturbance signal in an information signal, including a reading circuit to read the information signal from a storage device, an amplifier circuit to amplify the information signal and to add a DC bias signal to the information signal, a detection circuit to detect the disturbance signal by eliminating the DC bias signal and to output a detection signal in response to the detection of the disturbance signal, and a read channel circuit to receive the information signal and the detection signal. The detection circuit eliminates the DC bias signal from the information signal.

Additionally, the amplifier circuit and the detection circuit are connected by a signal path, and the detection circuit includes a comparator to remove the DC bias signal from the signal path.

Further, the amplifier circuit and the detector circuit are connected by a signal path, and the detector circuit includes a comparator connected to but short from the signal path.

DETAILED DESCRIPTION OF THE INVENTION

Figure 6:
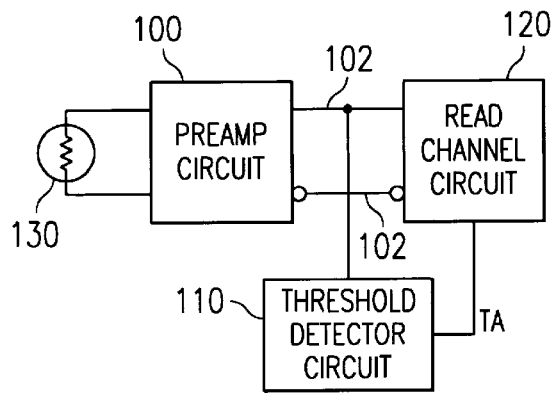
FIG. 6 illustrates a read channel circuit in accordance with the present invention.

The MR head 130 reads the total information signal 6 from a magnetic recording surface and transmits the total information signal 6 to the preamp circuit 100. FIG. 6 illustrates that the preamp circuit 100 transmits the total information signal 6 with the DC offset signal to threshold detection circuit 110 and to the read channel circuit 120 along the main signal path.

The detection circuit 110 is connected to the preamp circuit 100 by a connection to the main signal path 102 to obtain the information signal while the information signal is being transferred from the preamp circuit 100 to the read channel circuit 120.

Figure 1:
FIG. 1 illustrates the information signal without the disturbance signal.
Figure 2:
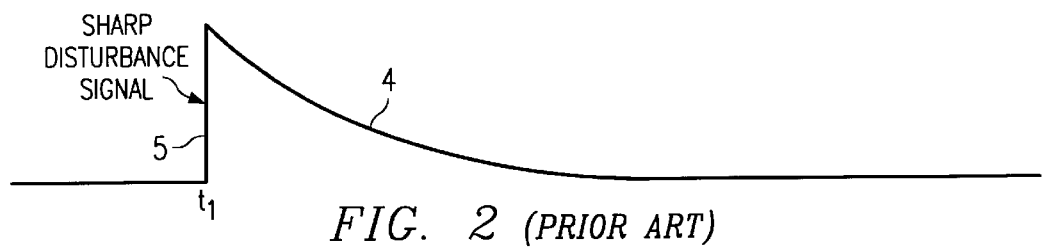
FIG. 2 illustrates the illustrates the disturbance signal without the information signal.
Figure 3:
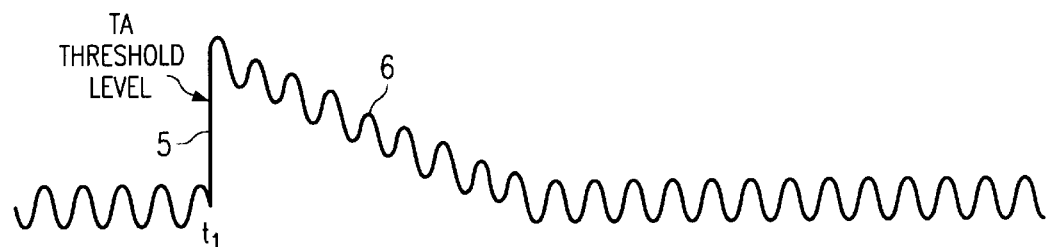
FIG. 3 illustrates the information signal and the disturbance signal combined.
Figure 4:
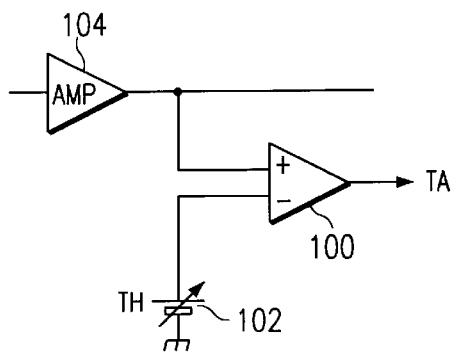
FIG. 4 illustrates a detector circuit for a sharp disturbance signal of the disturbance signal.
Figure 5:
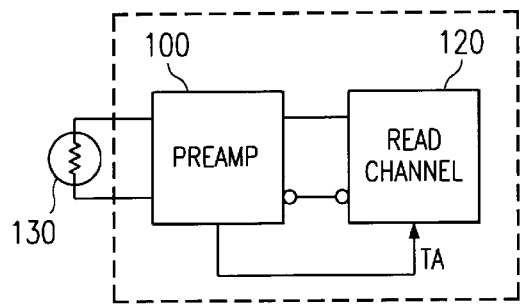
FIG. 5 illustrates a read channel circuit.

As illustrated in FIG. 3, the total information signal 6 may include the disturbance signal 4 including the sharp disturbance signal 5 to result in the total information signal 6.

Figure 9:
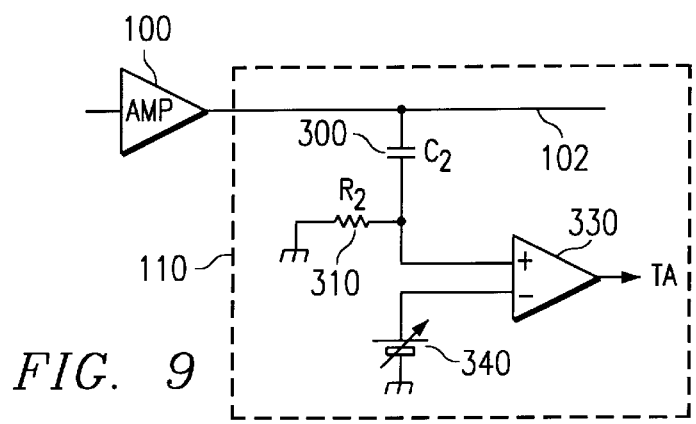
FIG. 9 illustrates another threshold detection circuit in accordance with the present invention.

As discussed above, the total information signal 6 may be combined with the disturbance signal 4 including the sharp disturbance signal 5, as shown in FIG. 3. As illustrated in FIG. 9, the threshold detection circuit may include a capacitor connected to one leg of the input to the comparator 330 and connected to the main signal path 102. A resistor 310 may be connected to the ground between the capacitor 300 and the input to the comparator 330 to form a RC circuit.

Additionally, connected to another input of the comparator 330 is a threshold voltage 340 set to approximately 20% of the sharp disturbance signal 5 over the zero level of the information signal. If the amplifier circuit 100 outputs a DC gain offset along the main signal path, this signal will not be transmitted to the comparator 330, since the capacitor 300 will block the DC offset gain component of the information signal. Thus, the comparator 330 will not provide a false tripping signal based on or caused by the DC gain offset. Since, capacitor 300 is not directly in the connection to the read channel circuit 120 the capacitor 300 does not affect the information signal 4 input to the read channel circuit 130, when the voltage across the capacitor 300 exceeds the threshold voltage from the voltage source 340.

Figure 7:
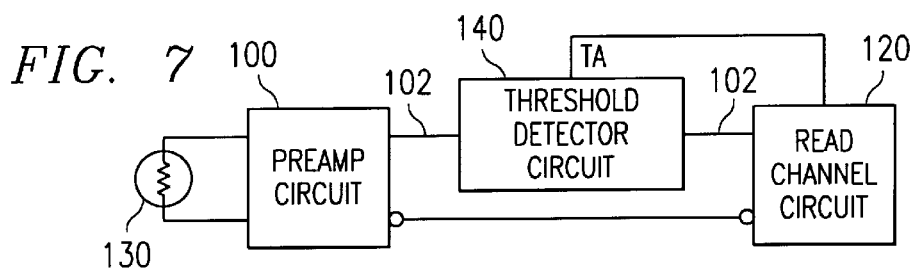
FIG. 7 illustrates another embodiment of the read channel circuit in accordance with the present invention.
Figure 8:
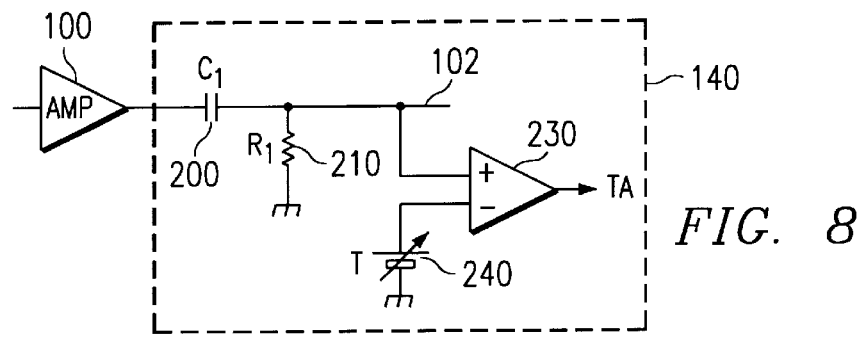
FIG. 8 illustrates a threshold detection circuit in accordance with the present invention.

FIG. 7 illustrates another embodiment of the present invention with the threshold detection circuit 140 positioned between the preamp circuit 100 and the read channel circuit 120. In this embodiment, the threshold detection circuit 140 is positioned in the main signal path 102. This threshold detection circuit 140 is illustrated in FIG. 8. The capacitor 200 is connected directly in the main signal path 102 and between the preamp circuit 100 and the read channel circuit 120. Connected between the capacitor 200 and the read channel circuit is a resistor 210 connected to the main signal path 102 and comparator 230. One leg of the comparator is connected to the main signal path 102 between the preamp circuit 100 and the read channel circuit 120. Additionally, another leg of the comparator 230 is coupled again between the capacitor 200 and the read channel circuit 120. The DC offset from amplifier 100 is eliminated through the capacitor 200. When the voltage from the capacitor 200 reaches a voltage in excess of the threshold voltage set by the threshold voltage generator 240 the comparator 230 outputs a TA signal to indicate that the sharp disturbance signal 5 has been detected.

What is claimed:

1. An apparatus for detecting a disturbance signal in an information signal, comprising:

a reading circuit to read the information signal from a storage device;

an amplifier circuit to amplify the information signal and to add a DC bias signal to the information signal;

a detection circuit including a resistor and capacitor to form an RC circuit to detect the disturbance signal by eliminating the DC bias signal and to output a detection signal in response to said detection of the disturbance signal, said detection circuit having said resistor connected to ground; and a read channel circuit to receive said information signal and said detection signal.

2. An apparatus for detecting a disturbance signal in an information signal, as in claim 1, wherein said detection circuit eliminates said DC bias signal from the information signal.

3. An apparatus for detecting a disturbance signal in an information signal, as in claim 1, wherein said amplifier circuit and said detection circuit are connected by a signal path and wherein said detection circuit includes a comparator to remove said DC bias signal from said signal path.

4. An apparatus for detecting a disturbance signal in an information signal, as in claim 1, wherein said amplifier circuit and said detection circuit are connected by a signal path and wherein said detection circuit includes a comparator connected to said signal path.

* * * * *